US011966766B2

(12) United States Patent
Lan et al.

(10) Patent No.: US 11,966,766 B2
(45) Date of Patent: Apr. 23, 2024

(54) REDUCTION SERVER FOR FAST DISTRIBUTED TRAINING

(71) Applicant: Google LLC, Mountain View, CA (US)

(72) Inventors: Chang Lan, Kirkland, WA (US);
Soroush Radpour, Vancouver (CA)

(73) Assignee: Google LLC, Mountain View, CA (US)

( * ) Notice: Subject to any disclaimer, the term of this patent is extended or adjusted under 35 U.S.C. 154(b) by 459 days.

(21) Appl. No.: 17/076,393

(22) Filed: Oct. 21, 2020

(65) Prior Publication Data

US 2022/0121465 A1 Apr. 21, 2022

(51) Int. Cl.
*G06F 9/455* (2018.01)
*G06N 3/08* (2023.01)
*G06N 3/084* (2023.01)
*G06N 3/098* (2023.01)

(52) U.S. Cl.
CPC ........... *G06F 9/45558* (2013.01); *G06N 3/08* (2013.01); *G06N 3/084* (2013.01); *G06F 2009/45562* (2013.01); *G06F 2009/4557* (2013.01); *G06N 3/098* (2023.01)

(58) Field of Classification Search
None
See application file for complete search history.

(56) References Cited

U.S. PATENT DOCUMENTS

2019/0324856 A1 10/2019 Zhao et al.
2019/0325302 A1* 10/2019 Savic ................. G06F 8/31

OTHER PUBLICATIONS

Vepakomma et al., "No Peek: A Survey of private distributed deep learning", Dec. 8, 2018. (Year: 2018).*
Zhou et al., "KunPeng: Parameter Server based Distributed Learning Systems and Its Applications in Alibaba and Ant Financial", Aug. 2017, KDD 2017 Applied Science Paper, pp. 1693-1702. (Year: 2017).*
Chen et al., "Elastic Parameter Server Load Distribution in Deep Learning Clusters", Oct. 12, 2020, ACM, pp. 507-521. (Year: 2020).*
Duong. FC2: cloud-based cluster provisioning for distributed machine learning. Feb. 8, 2019. Cluster Computing, Baltzer Science Publishers, Bussom, NL, vol. 22, No. 4, pp. 1299-1315, DOI: 10.1007/S10586-019-02912-6.

(Continued)

*Primary Examiner* — Qing Yuan Wu
(74) *Attorney, Agent, or Firm* — Lerner David LLP

(57) ABSTRACT

A data processing system, that includes: one or more host processing devices, the one or more host processing devices may be configured to support instantiation of a plurality of virtual machines such that a first set of virtual machines run one or more worker processes, each worker process operating on a respective data set to produce a respective gradient. The host processing devices may be configured to support instantiation of a second set of virtual machines running one or more reducer processes that operate on each respective gradient produced by each worker process to produce an aggregated gradient. The one or more reducer processes may cause the aggregated gradient to be broadcasted to each worker process.

19 Claims, 12 Drawing Sheets

(56) References Cited

OTHER PUBLICATIONS

Wagenländer et al. Spotnik: Designing Distributed Machine Learning for Transient Cloud Resources. Jul. 1, 2020. 12th USENIX Workshop on Hot Topics in Cloud Computing (HotCloud 20). Retrieved from the Internet: <https://www.usenix.org/system/files/hotcloud20_paper_wagenlander.pdf>. [retrieved on Jan. 17, 2022].

Han et al. A Quantitative Study of Deep Learning Training on Heterogeneous Supercomputers. Sep. 23, 2019. 2019 IEEE International Conference on Cluster Computing (Cluster), IEEE, pp. 1-12, DOI: 10.1109/CLUSTER.2019.8890993.

Duong et al. Distributed Machine Learning on IAAS Clouds. Nov. 23, 2018. 2018 5th IEEE International Conference on Cloud Computing and Intelligence Systems (CCIS), IEEE, pp. 58-62, DOI: 10.1109/CCIS.2018.8691150.

International Search Report and Written Opinion for International Application No. PCT/US2021/054973 dated Jan. 25, 2022. 16 pages.

International Preliminary Report on Patentability for International Application No. PCT/US2021/054973 dated May 4, 2023. 9 pages.

\* cited by examiner

200

400

500

600

1000

1200

REDUCTION SERVER FOR FAST DISTRIBUTED TRAINING

BACKGROUND

Machine learning, in general, relies on statistical techniques to build models based on sample data. Machine learning provides computer systems with the ability to learn based on the sample data so as to improve performance associated with a given task, e.g., make accurate predictions or decisions, without being explicitly programmed to do so. Machine learning may be characterized based on three parameters: experience ("E"), tasks ("T") and performance measure ("P"). A standard definition of machine learning using those three parameters is the following: A computer program or system is regarded as learning from experience E with respect to tasks T, if the program or system's performance as measured by P improves with experience E. Experience E comprises sample data, which is more commonly referred to as training data. Deep learning is a form of machine learning that relies on neural network concepts in processing data, e.g., the training data.

The Internet has become a source of voluminous data from a variety of sources, e.g., internet search engines, e-commerce platforms, etc., across the globe. This voluminous data is commonly referred to as big data. It provides a source of data for training a variety of applications, e.g., fraud detection, speech recognition, object recognition, decision making, etc. Processing the enormous amount of data available as big data typically requires the use of cloud computing resources where the data is split or broken up across multiple machines for distributed processing.

SUMMARY

Distributing the data processing associated with training data for machine learning across multiple machines offers the potential for fast distributed training but involves considerations and management of parameters such as cost, latency, efficiency, and bottlenecks associated with both data processing and communications among processing machines. An aspect of the disclosed technology is provision of systems, system of architectures or techniques that provide a collective communication primitive for synchronous training that can improve throughput by as much as a factor of two (2) times that of allreduce.

An aspect of the disclosed technology may in one form be a data processing system. The system may comprise one or more host processing devices, the one or more host processing devices supporting instantiation of a plurality of virtual machines. The system may further comprise a first set of virtual machines comprising one or more of the plurality of virtual machines, the first set of virtual machines running one or more worker processes, each worker process operating on a respective data set to produce a respective gradient and a second set of virtual machines comprising one or more of the plurality of virtual machines, the second set of virtual machines running one or more reducer processes that operate on at least a portion of each respective gradient produced by each worker process to produce an aggregated gradient. The one or more reducer processes cause the aggregated gradient to be broadcasted to each worker process.

Other aspects of the disclosed technology of the system may comprise, for instance, that each respective data set comprises data blocks of equal size. The data blocks of equal size may comprise data blocks generated by splitting an input data stream. The data blocks of equal size may be of a size proportional to the number of reducer processes running on the one or more virtual machines.

Other aspects of the disclosed technology of the system may comprise, for instance, that the one more host processing devices comprise at least one graphics processing unit (GPU) for hosting the first set of virtual machines. The one more host processing devices may for instance also comprise at least one central processing unit (CPU) for hosting the second set of virtual machines.

Other aspects of the disclosed technology of the system may comprise, for instance, that a first total bandwidth associated with use of the first set of virtual machines is equal to a second total bandwidth associated with use of the second set of virtual machines.

Other aspects of the disclosed technology of the system may comprise, for instance, that the one or more reducer processes accept gradients within a time deadline defined by receipt of a first one of the gradients by a first reducer process among the one or more reducer processes.

Other aspects of the disclosed technology of the system may comprise, for instance, that one or more worker processes are instantiated as a communication primitive of an Application Programming Interface (API) library or separate from an API library. When one or more worker processes is instantiated as a communication primitive of an API library, instantiated worker processes push and pull gradients from the one or more reducer processes. The one or more worker processes may also or alternatively be instantiated as separate from an API library such that connections between a reducer process function manages connections and data transfers between the one or more worker processer and the one or more reducer processes.

In yet other aspects of the disclosed technology, each worker process of the one or more worker processes may for instance partition gradients produced by each worker process into respective gradient chunks and a given worker process pulls a first gradient chunk from a first reduction process while it pushes a second gradient chunk to the first reduction process. The worker processes may also for instance adjust weight coefficient of a neural network according to a mini batch stochastic gradient descent in the context of training a neural network.

Other aspects of the disclosed technology of the system may comprise, for instance, that a reduction is computed by the one or more reducer processes only over a subset of gradient batches received from a subset of the one or more worker processes ignoring a remainder of gradient batches, the subset having a predetermined size m or the size of the subset being determined by gradient batches received up to a predetermined deadline T after receipt of a first gradient batch.

An aspect of the disclosed technology may in one form be a data processing system. The system may comprise one or more host processing devices, the one or more host processing devices supporting instantiation of a plurality of virtual machines; a first set of virtual machines comprising one or more of the plurality of virtual machines, the first set of virtual machines running one or more worker processes, each worker process operating on a respective data block to each produce a respective gradient; a reduction server comprising one or more reducers, each reducer comprising a virtual machine running a reducer process that operates on at least a portion of each respective gradient to generate an aggregated gradient; wherein the reduction server broadcasts the aggregated gradient to the one or more virtual machines running the one or more worker processes.

Other aspects of the disclosed technology of the system may comprise, for instance, that a reduction is computed by the reduction server only over a subset of gradient batches received from a subset of workers ignoring a remainder of gradient batches, the subset having a predetermined size m or the size of the subset being determined by gradient batches received up to a predetermined deadline T after receipt of a first gradient batch. Each of the respective data block may comprise for instance data blocks of equal size. The data blocks of equal size may be of a size proportional to the number of reducer processes running on the one or more virtual machines.

Other aspects of the disclosed technology of the system may comprise, for instance, that the one more host processing devices may also comprise at least one graphics processing unit (GPU) for hosting the first set of virtual machines. The one more host processing devices comprise at least one central processing unit (CPU) for hosting the reducers of the reduction server. In additional aspects, a first total bandwidth associated with use of the first set of virtual machines may be equal to a second total bandwidth associated with use of the reduction server.

Other aspects of the disclosed technology of the system may comprise, for instance, that each reducer accept gradients within a time deadline defined by receipt of a first one of the gradients by a first reducer among the one or more reducers.

Other aspects of the disclosed technology of the system may comprise, for instance, that the one or more worker processes are instantiated as a communication primitive of an Application Programming Interface (API) library or separate from an API library. The one or more worker processes may alternatively be instantiated as a communication primitive of an API library, instantiated worker processes push and pull gradients from the one or more reducer processes. When the one or more worker processes are instantiated as separate from an API library, connections between a reducer process function manages connections and data transfers between the one or more worker processer and the one or more reducer processes.

Other aspects of the disclosed technology of the system may comprise, for instance, that the one or more worker processes partition gradients produced by each worker process into respective gradient chunks and a given worker process pulls a first gradient chunk from a first reducer while it pushes a second gradient chunk to the reducer. The worker processes may also or alternatively adjust weight coefficient of a neural network according to a mini batch stochastic gradient descent in the context of training a neural network.

An aspect of the disclosed technology may in one form be a method for synchronous distributed training, comprising: instantiating a first set of virtual machines running one or more worker processes, each worker process operating on a respective data block to each produce a respective gradient; instantiating a second set of virtual machines that comprise a reduction server, the second set of a virtual machines running a reducer process that operates on at least a portion of each respective gradient to generate an aggregated gradient; and broadcasting, by the reduction server, the aggregated gradient to the first set of virtual machines.

Other aspects of the disclosed technology of the method may comprise, for instance, processing, by the first set of virtual machines, the aggregated gradient to produce an output data file. An additional aspect of the disclosed method may comprise computing, by the reduction server, a reduction only over a subset of gradient batches received from a subset of workers ignoring a remainder of gradient batches, the subset having a predetermined size m or the size of the subset being determined by gradient batches received up to a predetermined deadline T after receipt of a first gradient batch.

Other aspects of the disclosed technology of the method may comprise, for instance, computing a reduction only over a subset of gradient batches received from a subset of workers ignoring a remainder of gradient batches, the subset having a predetermined size m or the size of the subset being determined by gradient batches received up to a predetermined deadline T after receipt of a first gradient batch.

Other aspects of the disclosed technology of the method may comprise, for instance, that instantiating the first set of virtual machines running one or more worker processes comprises instantiating the first set of virtual machines on at least one graphics processing unit (GPU).

Other aspects of the disclosed technology of the method may comprise, for instance, that instantiating the second set of virtual machines that comprise the reduction server comprises instantiating one or more central processing unit (CPU) for hosting one or more reducers of the reduction server.

Other aspects of the disclosed technology of the method may comprise, for instance, that a first total bandwidth associated with use of the first set of virtual machines is equal to a second total bandwidth associated with use of the reduction server.

Other aspects of the disclosed technology of the method may comprise, for instance, accepting by each of one or more reducers gradients within a time deadline defined by receipt of a first one of the gradients by a first reducer among the one or more reducers.

An aspect of the disclosed technology may in one form be non-transitory computer readable media having stored thereon instructions to operate one or more processing devices, the instructions causing the one or more processing devices to implement a process or method. The process comprising instantiating a first set of virtual machines running one or more worker processes, each worker process operating on a respective data block to each produce a respective gradient; instantiating a second set of virtual machines that comprise a reduction server, the second set of a virtual machines running a reducer process that operates on at least a portion of each respective gradient to generate an aggregated gradient; and broadcasting, by the reduction server, the aggregated gradient to the first set of virtual machines. Other aspects of the disclosed technology of the non-transitory computer readable media may comprise, for instance, storing other instructions that cause the one or more processing devices to perform other method steps or processing of this disclosure.

DETAILED DESCRIPTION

Overview

Figure 1:
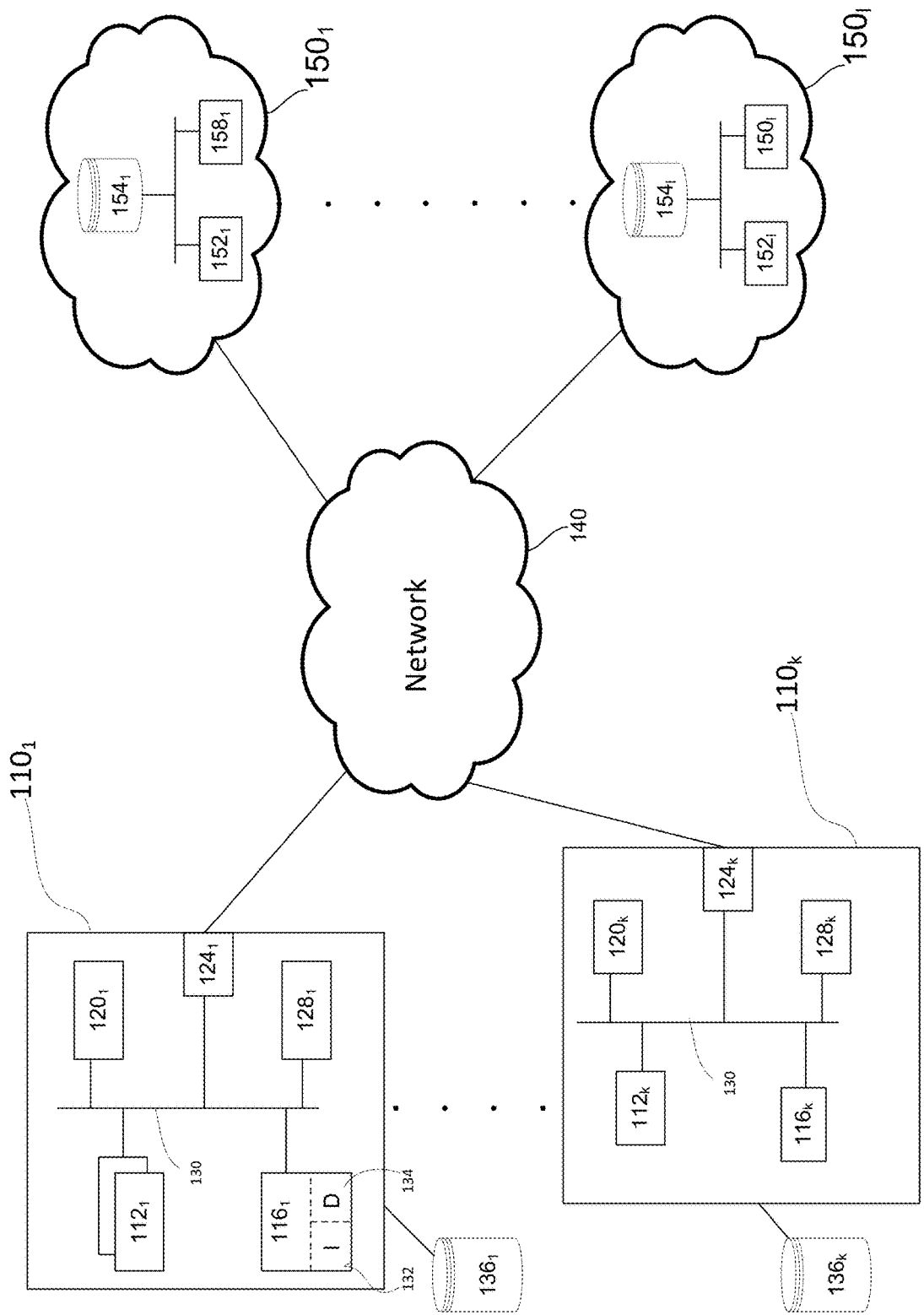
FIG. 1 is a block diagram of an example cloud system according to aspects of the disclosed technology.

Aspects of the disclosed technology comprise techniques and systems for managing the processing of data, particularly voluminous amounts of data or big data, as part of, for example, synchronous training procedures for machine learning type applications. The technique may be implemented as a reduction service or a reduction server in a distributed computing environment. The distributed environment includes data processing systems comprising one or more host processing devices that support instantiation of a plurality of virtual machines (VMs). For example, the technique may be implemented as a service in which VMs with relatively small virtual central processing units (vCPUs) (i.e., small footprint in terms of required resources) provide reduction operations on gradients received from workers running worker processes, and return one or more aggregated gradients back to the workers. In this way, the reduction process or operation is provided as a service by the vCPUs functioning as reducer nodes in a data processing network. In a system, the collection of vCPUs assigned to carry out the reduction operation may be considered a reduction server. Alternatively, worker and reduction processes may be implemented to execute on physical hardware.

Processing data as part of synchronous training typically involves using collective communications primitives such as allreduce, which generally comprises a communication operation used in distributed learning systems, and their implementation as part of the NVIDIA Collective Communications Library (NCCL). Communication primitives comprise high level constructs or abstraction with which programs (e.g., accessible via an Application Programming Interface ("API")) use the underlying communications network that interconnects processing resources (e.g., vCPUs, vGPUs (virtual Graphics Processing Units), storage, etc.). Use of allreduce has become widespread enough where it might be considered a de-facto standard for gradient aggregation in synchronous distributed GPU training. However, allreduce operations are increasingly becoming a bottleneck in distributing training, particularly where operations are associated with large models. For example, the time to perform the operations associated with an allreduce request is proportional to the number of nodes, n, in relation to bandwidth B as follows: $t=(S/B)*(2*(n-1)/n)$, where S is the number of elements to be processed. The ratio of how much network traffic is incurred by allreduce for every bit of input data can be deduced from the foregoing formula to be a minimum of $2(n-1)/n$. An aspect of the disclosed technology comprises a more bandwidth efficient technique that reduces the ratio of $2(n-1)/n$. For example, reduce services are added that assist worker processes to compute reductions necessary in the process of training neural networks according to gradient descent methods. While the provision of reduce services requires additional resources and possibly hardware, the technique and architecture proposed herein is advantageous since in one aspect it reduces the communication complexity of conventional methods of computing the reductions among the workers themselves. The reduction in communication complexity leads to a higher throughput, e.g., more efficient use of bandwidth, in computing the reduction.

From the perspective of the NCCL environment, the reduction service or reducer role may not be a part of NCCL. Specifically, in one aspect of the technology when a worker or worker process executes a collective operation such as "all-reduce" with the reducer role or Reduction Server enabled, workers push and pull gradients from reducers external to NCCL. As such, the reducer role or Reduction Server comprises a collective communication primitive for synchronous training that may be implemented as part of an API supporting NCCL but that runs outside NCCL. Alternatively, the Reduction Server concept may be implemented as a communication primitive within NCCL.

In an example method, data in one or more input files is split into data blocks, which may be of equal size though equal size data blocks is not a requirement, and provided to worker agents or processes ("workers"). The workers operate to produce intermediate data blocks or gradients. For example, the workers may perform backpropagation (or other comparable techniques for supervised learning of artificial networks using gradient descent) operations to calculate gradients for model parameters based on the input data for a current iteration. As such, gradients, which may be considered intermediate data blocks, are mapped from model parameters. The workers then push the intermediate data blocks or gradients to reducers. Specifically, assuming n workers and m reducers, each worker pushes its i-th block to the i-th reducer, so that each reducer receives n total blocks of data (or more generally n/m of input data). This ensures that the computation and communication to carry out the reduction is distributed evenly across the reducers, thereby avoiding bottlenecks and supporting high resource utilization by balancing the workload evenly across the reducers. Each reducer then reduces the n blocks it receives into a single data block or an aggregated gradient, and broadcasts the aggregated gradient or single data block back to all n workers. For example, a reduction operation may comprise computing the sum or average of gradients received. After computing the reduction, the reducer communicates the result of the reduction operation back to the workers that provided the gradient. Reduction Server thus pushes and pulls gradients from workers. Typically, workers apply a received gradient to update their parameter. After all parameters are updated, the next iteration of training begins. The workers and reducers may thus exchange gradients in an iterative process using the push/pull operations as part of a gradient descent process to arrive at a solution within an error bound (e.g., error between a model and its parameters) or a given minima associated with a cost function.

From the perspective of architecture, the system is implemented in a distributed computing system such as for example in a cloud computing environment. Workers are implemented as worker processes running on virtual GPUs that receive data blocks split out from an input data file or stream. The workers then operate on data blocks as described above to produce intermediate data blocks that are provided to reducers. In the context of gradient descent learning, an intermediate data block produce by a worker may comprise a set of gradients resulting from training of a mini-batch in a stochastic gradient descent. The reducers are implemented as reducer processes running on vCPUs. The reducers each perform reduction operations and return the aggregated gradient or single data block as described above to the workers for further processing. With regard operation of the system, system performance is enhanced where the total bandwidth of the reducers is equal to the total bandwidth of the workers. The system also includes one or more master processes that assign tasks to workers and reducers.

The provision of a Reduction Server or reduction service provides as an advantage improvement in the bandwidth requirements for the allreduce operation in a cloud environment by providing a more bandwidth efficient operations from the perspective of communications. For example, through use of Reduction Server, each worker will typically only need to send and receive one byte of gradient for every byte of gradient that is processed. In contrast, each worker in conventional allreduce processing, which does not make explicit use of reducers or reduction services, sends and receives each gradient $2*(n-1)/n$ times. The use of reducers or reduction services therefore significantly reduces the number of messages exchanged (sent and received) by individual workers to obtain the results of the reduction operation. Furthermore, the computation of the reduction operation is offloaded from the workers to the reducers or reduction services.

Moreover, Reduction Server processing reduces latency and comes at reduced cost by virtue of using vCPUs for at least some iterations of the reduce operation. In this regard, Reduction Server does not require specialized hardware and fabric support, which aids in cost reductions. Further, in terms of bandwidth, Reduction Server can match the network bandwidth processing capability for GPUs at a fraction of the cost of such GPUs.

Example Systems and API Models

FIG. 1 is an example system 100 in accordance with aspects of the disclosure. System 100 includes one or more computing devices 110, which may comprise computing devices 1101 through 110k, storage 138, a network 140 and one or more cloud computing systems 150, which may comprise cloud computing systems 1501 through 150l. Computing devices 110 may comprise computing devices located at customer location that make use of cloud computing services such as Infrastructure as a Service (IaaS), Platform as a Service (PaaS), and/or Software as a Service (SaaS). For example, if a computing device 110 is located at a business enterprise, computing device 110 may use cloud systems 150 as a service that provides software applications, e.g., accounting, word processing, inventory tracking, etc., applications, to computing devices 110 used in operating enterprise systems. In addition, computing device 110 may access cloud computing systems 150 as part of its operations that employ machine learning, deep learning, or more generally artificial intelligence technology, to train applications that supports its business enterprise. For example, computing device 110 may comprise a customer computer or server in a bank or credit card issuer that accumulates data relating to credit card use by its card holders and supplies the data to a cloud platform provider, who then processes that data to detect use patterns that may be used to update a fraud detection model or system, which may then be used to notify the card holder of suspicious or unusual activity with the card holder's credit card account. Other customers may include social media platform providers, government agencies or any other business that uses machine learning as part of its operations. The machine or deep learning processes, e.g., gradient descent, provided via system 150 may provide model parameters that customers use to update the machine learning models used in operating their businesses.

As shown in FIG. 1, each of computing devices 110, may include one or more processors 112, memory 116 storing data (D) and instructions (I), display 120, communication interface 124, and input system 128, which are shown as interconnected via network 130. Computing device 110 may also be coupled or connected to storage 136, which may comprise local or remote storage, e.g., on a Storage Area Network (SAN), that stores data accumulated as part of a customer's operation. Computing device 110 may comprise a standalone computer (e.g., desktop or laptop) or a server associated with a customer. A given customer may also implement as part of its business multiple computing devices as servers. If a standalone computer, network 130 may comprise data buses, etc., internal to a computer; if a server, network 130 may comprise one or more of a local area network, virtual private network, wide area network, or other types of networks described below in relation to network 140. Memory 116 stores information accessible by the one or more processors 112, including instructions 132 and data 134 that may be executed or otherwise used by the processor(s) 112. The memory 116 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods and routines of the instructions are explained in more detail below.

The data 132 may be retrieved, stored or modified by processor 112 in accordance with the instructions 132. As an example, data 132 associated with memory 116 may comprise data used in supporting services for one or more client devices, an application, etc. Such data may include data to support hosting web-based applications, file share services, communication services, gaming, sharing video or audio files, or any other network based services.

The one or more processors 112 may be any conventional processor, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be located or stored within the same physical housing. In one example, one or more computing devices 110 may include one or more server computing devices having a plurality of computing devices, e.g., a load balanced server farm, that exchange information with different nodes of a network for the purpose of receiving, processing and transmitting the data to and from other computing devices as part of customer's business operation.

Computing device 110 may also include a display 120 (e.g., a monitor having a screen, a touch-screen, a projector, a television, or other device that is operable to display information) that provides a user interface that allows for controlling the computing device 110. Such control may include for example using a computing device to cause data to be uploaded through input system 128 to cloud system 150 for processing, cause accumulation of data on storage 136, or more generally, manage different aspect of a customer's computing system. While input system 128 may be used to upload data, e.g., a USB port, computing system may also include a mouse, keyboard, touchscreen or microphone that can be used to receive commands and/or data.

The network 140 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc. and various combinations of the foregoing. Such communication may be facilitated by any device capable of transmitting data to and from other computing devices, such as modems and wireless interfaces. Computing device interfaces with network 140 through communication interface 124, which may include the hardware, drivers and software necessary to support a given communications protocol.

Cloud computing systems 150 may comprise one or more data centers that may be linked via high speed communications or computing networks. A given data center within system 150 may comprise dedicated space within a building that houses computing systems and their associated components, e.g., storage systems and communication systems. Typically, a data center will include racks of communication equipment, servers/hosts and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well provide redundancy and maintain high availability. Similarly, different cloud computing systems are typically provided at different geographic locations.

As shown in FIG. 1, computing system 150 may be illustrated as comprising infrastructure 152, storage 154 and computer system 158. Infrastructure 152, storage 154 and computer system 158 may comprise a data center within a cloud computing system 150. Infrastructure 152 may comprise servers, switches, physical links (e.g., fiber) and other equipment used to interconnect servers within a data center with storage 154 and computer system 158. Storage 154 may comprise a disk or other storage device that is partitionable to provide physical or virtual storage to virtual machines running on processing devices within a data center. Storage 154 may be provided as a SAN within the datacenter hosting the virtual machines supported by storage 154 or in a different data center that does not share a physical location with the virtual machines it supports. Computer system 158 acts as supervisor or managing agent for jobs being processed by a given data center. In general, computer system 158 will contain the instructions necessary to, for example, manage the operations requested as part of synchronous training operation on customer data. Computer system 158 may receive jobs, for example, as a result of input receive via an application programming interface (API) from a customer.

Figure 2:
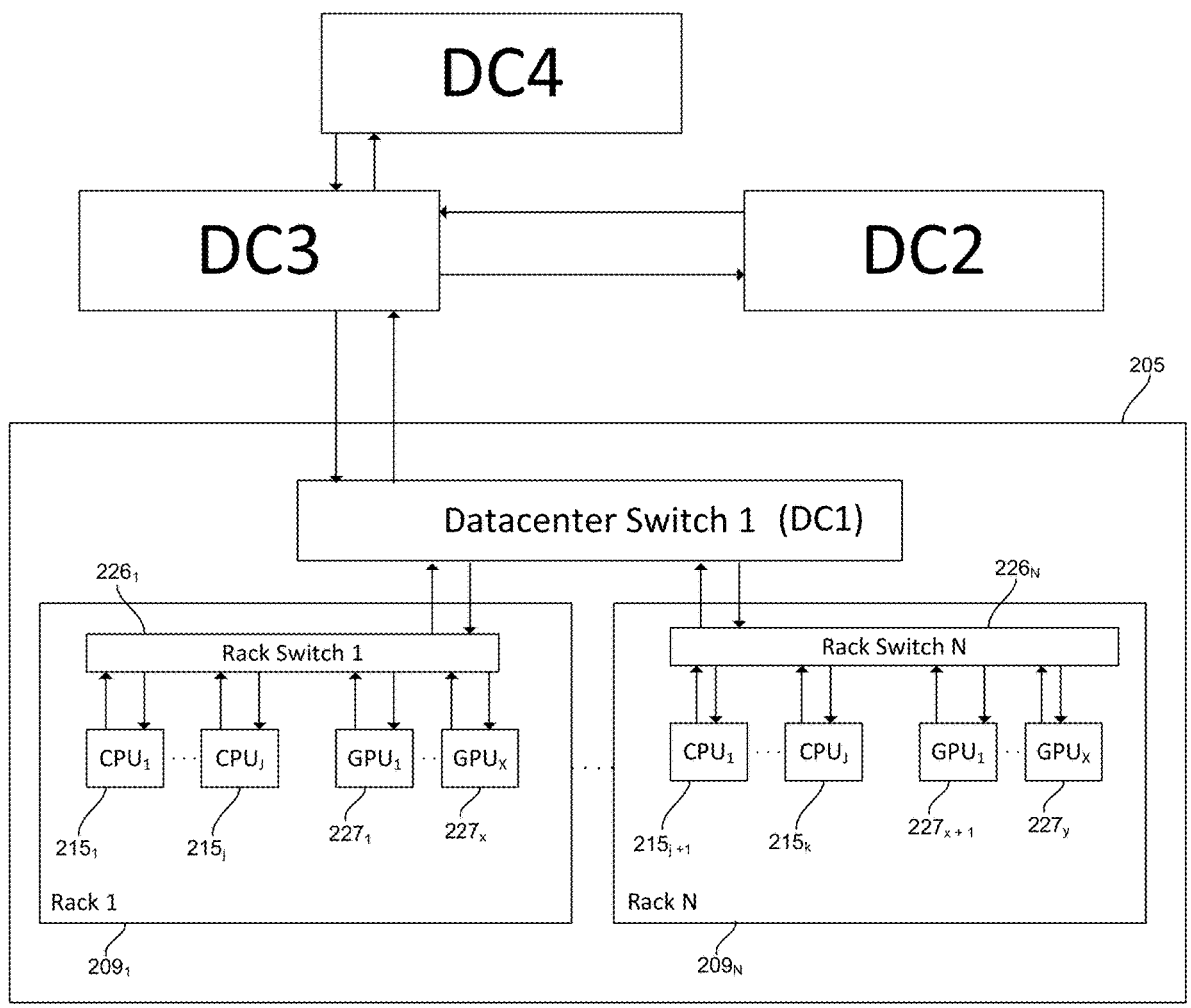
FIG. 2 is a block diagram of an example distributed data processing system according to aspects of the disclosed technology.

FIG. 2 is a block diagram of an example of a cloud based distributed data processing system 200 according to aspects of the disclosed technology. FIG. 2 shows examples of cloud computing systems 150 in terms of interconnected data centers DC1 through DC4. The datacenters may be distributed among the cloud computing systems 150, and more than one datacenter may comprise a given cloud. Those skilled in the art will appreciate that the system layout is but one example configuration and that the system may be illustrated in other layouts or forms.

The system 200 receives, stores, processes and outputs data. The system 200 may include optical links or other communication channels, along other hardware such as modems, routers, switches, bridges, wireless antennas and towers to facilitate relatively high speed transportation of data between processing devices, e.g., CPUs or GPUs, within a datacenter, as well as between datacenters. Within datacenters, network communications may take place over a local area network (LAN) and between datacenters involve wide area networks (WANs.)

Datacenters may be located near each other or, conversely, far from each other. As shown DC1 205 includes a number of equipment racks 209. Each rack is engineered to hold or support, typically on a tray, one or more servers, switches, storage, etc. In FIG. 2, servers are not shown for simplicity. Rather, the data processors 215, e.g., CPUs and GPUs, that may make up a server are shown as supported within the racks. The data processors can include processors that are associated with network attached storage devices, and other computer controlled devices. At least one processor may be operated as a master processor (e.g., as system 158 in FIG. 1) that controls scheduling of computing tasks and data distribution tasks performed through the networked system 200. As shown, processors within each rack may be interconnected through a rack switch 226. The racks within a datacenter can be interconnected via a datacenter switch.

Figure 3:
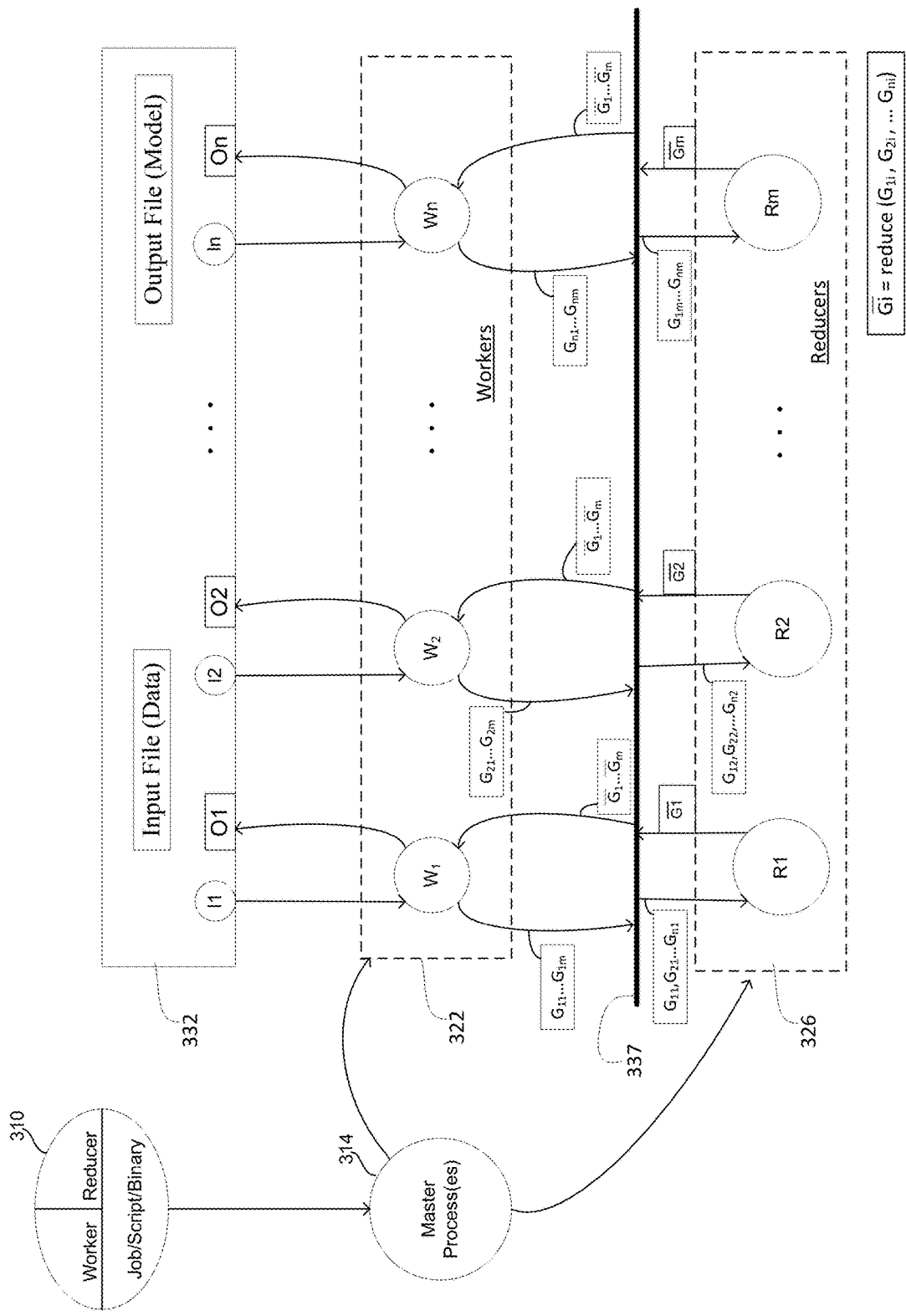
FIG. 3 is a block diagram illustrating a logical view of an example of a data processing system and data flow in a data processing system according to aspects of the disclosed technology.

FIG. 3 is a block diagram illustrating a logical view of an example of a data processing system and data flow in a large scale data processing system according to aspects of the disclosed technology. The system and flow may be implemented in the systems shown in FIG. 1 or FIG. 2. For example, they may be implemented in a single data center or, alternatively, may be implemented or spread over different data centers, as part of a cloud or distributed computing environment.

As shown in FIG. 3, the job or operation requested by a customer may be provided in the form of script or binary file 310. Application programmers may develop operators such as worker( . . . ), reduce( . . . ), partition( . . . ), etc. These operators are computer programs that process input data, received for example via input data files, into intermediate data or gradients. Reduce operations generally merge or otherwise combine intermediate data values, e.g., combining gradients produced by workers. Partition operations generally specify how intermediate data is to be partitioned over a set of intermediate data files. The operations (e.g., reduce)

invoke library functions that automatically handle reduction operations, I/O scheduling, transport, parallelization of computations, etc. The job request or script will be typically be created by an application programmer via an API. The API may then create a binary load file 310 that is received at computer system 158. Computer system 158 then processes the binary load file to create a set of processing tasks that are controlled or managed by a master process or processes 314. Master process(es) 314 may, for example, determine how many processes or tasks to use, such as reduce processes or tasks to use, etc., and which processors should be used to perform those tasks, as well where to store the gradients, or other forms of intermediate data and, ultimately, output files (including for example one or more files having an updated model(s) or updated model parameters).

As is discussed in further detail below, the concept of Reduction Server may not be a part of NCCL. In that instance, the reducer role may be different binary distinct from binary load file 310 as indicated by the separation between the worker and reduce operations in file 310. Regardless of whether Reduction Server is implemented within or without NCCL, it provides a different architecture overlay in a cloud environment. The collection of reducers, reduction agents or reduction processes that may comprise a Reduction Server, not only provide advantages as to efficient bandwidth management and latency mitigation, but also allows more dynamic allocation of computing resources, whether that be at the host or virtual machine level. Specifically, Reduction Server improves distributed computing architectures particularly those used for machine learning, including deep machine learning or neural network.

Master 314 may assign tasks to one or more processors in datacenters where the input files are stored. In accordance with an aspect of the disclosed technology, master 314 may also determine the appropriate processor for executing a given task, e.g, vGPUs for tasks performed by worker processes or agents and vCPUs for tasks performed by reducer agents or processes. Master processes 314 are coupled to one or more virtual machines 322, and 326. Virtual machines 322 may comprise a first set of virtual machines each running worker processes or functioning as worker agents W1, W2, W3, . . . Wn. The first set of virtual machines may comprise vGPUs or vTPUs (virtual tensor processing units), each vGPU or vTPU may run one or more worker processes. Virtual machines 326 may comprise another or second set of virtual machines each running reduce processes or functioning as reducers, or reducer agents, R1, R2, R3, . . . Rm. Virtual machines 326 may comprise vCPUs, where each vCPU may run or more reduce processes.

As is shown in FIG. 3, block 332 includes input data for processing. The input data may comprise weight values or parameters associated with a neural network model. The input data is split into data blocks represented as I1, I2, I3, . . . In. Though not necessary, the data blocks may be spilt into equal sized data blocks, e.g., n equal sized data blocks. For example, each data block may comprise a 64 MB data block. Each worker, W1, W2, etc., receives a data block, I1, I2, etc., for processing. Each worker then pushes its ith block of to the ith reducer in block or reducer server 326. As illustrated workers and reducers communicate over a network 337, which may be a LAN within a data center or a LAN/WAN connection to another data center, as previously described in relation to FIGS. 1 and 2. As the ith block pushed by each worker is processed it may be considered intermediate data or data values, or gradients. As shown, each of W1, W2, W3, . . . , Wn pushes its first data block (i.e., i=1) to reducer R1 such that R1 receives data values $G_{11}$, $G_{21}$, $G_{31}$, . . . $G_{n1}$, where $G_{11}$ represents the first gradient, or more generally intermediate data value, from the first worker, $G_{21}$ represents the first gradient from the second worker, $G_{31}$ represents the first gradient from the third worker, and so on. Reducer R2 receives data receive values $G_{12}$, $G_{22}$, $G_{32}$, . . . $G_{n3}$; R3 receives data values $G_{13}$, $G_{23}$, $3_{33}$, . . . $3_{n3}$; and so on, such that Rm receives data values $G_{1n}$, $G_{2n}$, $n_{3n}$, . . . $G_{nm}$.

Each reducer reduces the n gradients or blocks of data it receives into a single or aggregated gradient or single data block as part of a reduce operation. Specifically, reducer R1 may generate a single data block or aggregated/single gradient G1, R2 generates single data block or gradient G2, R3 generates single data block or gradient G3, Rm generates single data block or gradient Gm, and so on. Note that aggregated gradients G1, G2, . . . Gm are shown in FIG. 3 with a bar above each aggregated gradient, whereas in this detailed description they are bolded and underlined, though the written description and drawings are discussing and showing the same aggregated gradient. Each reducer then broadcasts its respective gradient back to all the workers so that each worker receives each gradient. As shown in FIG. 3, each worker receives an aggregated gradient comprising G1, G2, . . . Gm. Each iteration of data processing, reducers aggregate gradients or data received from workers and workers pull aggregated gradients from reducers. Upon receipt of the gradient vector, each worker may perform further processing operations so as to generate output data values or files that represented as O1, O2, . . . On, which files may then be returned to the customer to, for example, to update a machine learning model.

Figure 4:
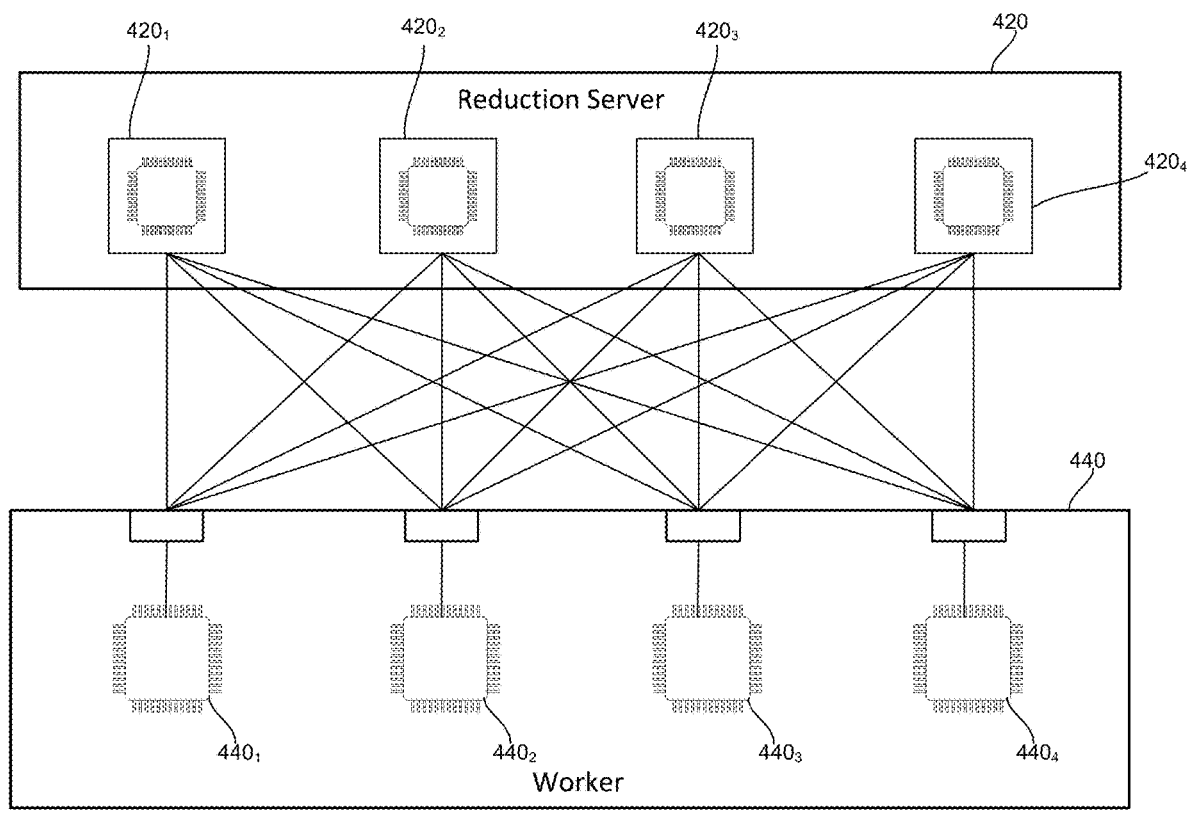
FIG. 4 is a block diagram of an example of a data processing system according to aspects of the disclosed technology.

FIG. 4 is a block diagram of an example of a data processing system 400 illustrating a reduction server 420 in communication with a collection of workers 440 according to aspects of the disclosed technology. In this example, reduction server 420 comprises four reducers $420_1$-$402_4$ communicatively coupled to four workers $440_1$-$440_4$. As shown, reduction server introduces an additional type of role to large data distributed processing systems: reducers. Reducers may comprise inexpensive CPU VMs with relatively small amounts of vCPUs. As illustrated in FIG. 4, the reducer role allows for computations and communications to be distributed evenly across the reducers, which may lead to improved performance including bottleneck avoidance. As is also indicated via the example shown in FIG. 4, the overall architecture provided via reduction server may be considered similar to the architecture for Parameter Server. As those skilled in the art may recognize, Parameter Server is a key-value store used for training machine learning models on a cluster. The values are the parameters of a machine-learning model (e.g., a neural network). The keys index the model parameters. However, unlike Parameter Server in which servers maintain model parameters, reducers are stateless and are responsible, or only responsible, for receiving gradients or intermediate data blocks from workers, performing a reduction operation, and sending gradients back to workers. The simplicity of the reducers enables performance improvements and allows for general application or homogeneity across different training applications. The reduction servers can be partitioned into shards, i.e., each reducer included in the reduction server processes a particular shard of the data provided by the workers. In a first step of an all-reduce operation, a worker provides to each reduction server the respective shard of gradient data to be included in the reduction computed by that reducer. Accordingly, each reducer receives a batch of gradients to be reduced from each of the workers or, as will be explained later in the case of stochastic gradient descent, a subset thereof. In the second steps, the reducer aggregates the inputs received from the workers using a reduction operation. In a third step, each reducer makes available the result of the reduction of the shard it is handling to all workers.

The provision of reduction server also allows a worker to shard its gradient among all the reducers. As such, in principle, reducers are not expected to require relatively high bandwidth, as long as the total aggregate bandwidth used by the reducers matches the total aggregate bandwidth by workers. If the bandwidth of each reducer is smaller than that of each worker, then the number of reducers would be more than the number of reducers. As an example, to achieve peak network performance for 2 worker VMs with 100 Gbps, either use 2 reducer VMs with 100 Gbps, or 8 reducer VMs with 25 Gbps could be used. This allows for additional flexibility in provisioning VM shapes for reducers in a dynamic cloud environment. Having the total aggregate bandwidth of the reducers equal to that of the workers, provides at least one benefit associated with the disclosed technology.

Synchronous training with a relatively large number of reducers may potentially be prone to stragglers. More specifically, Reduction Server with n workers and m reducers will have O(m*n) network links. The probability of stragglers (e.g., workers that are getting slower than other workers) goes up as the number of links increases. However, the impact of tail latency will not cascade because the reduction of each piece of tensors is independent of each other. Reduction Server should make sure the reduction is adaptively load balanced across reducers. In addition, additional approaches may be used to mitigate stragglers. These additional approaches may impact the deterministic nature of the training (although the end-to-end performance may improve) so they should be considered optional and used only if the tail latency impact is indeed problematic (i.e. as a last resort); these additional approaches are particular applicable to training based on mini-batch stochastic gradient descent:
  1. Backup workers. The reduction takes the first m of n gradients produced. This exploits the fact that in some circumstances it may be appropriate to ignore a particular batch in SGD (stochastic gradient descent). In other words, a reduction is computed by the reduction server only over a subset of gradient batches received from a subset of workers ignoring a remainder of gradient batches, the subset of workers having at least a predetermined size m smaller than the total number of workers. The minimum size of the subset may be determined empirically such as for example by a user. Trade-offs between training accuracy and speed may need to be taken into consideration: the smaller the size, the more noise there will be in the gradients but the faster the iteration will be typically.
  2. Bounded delay. The reduction takes gradients received within deadline T after the first gradient is received. This approach can also be combined with the first approach so that at least m gradients must be received before skipping the rest. In other words, a reduction is computed by the reduction server only over a subset of gradient batches received from a subset of workers, the size of the subset or workers being determined by gradient batches received up to a predetermined deadline T after receipt of the first gradient batch.

Reduction server may also reduce latency. Compared to the O(n) latency of conventional ring-allreduce and O(log n) latency of conventional tree allreduce, n being the number of worker nodes, the Reduction Server architecture disclosed herein only takes O(1) latency, since each worker carries out the allreduce operation, in a single exchange with the help of reducers, namely by communicating gradient data to each of the reducers and subsequently obtaining the results from each reducer. Because the reduction between n workers and k reducers in each iteration is simultaneous rather than sequential, the latency is independent of the number of reducers:

|  | Ring allreduce | Tree allreduce | Reduction Server |
| --- | --- | --- | --- |
| Algorithm bandwidth | Busbw * n/2(n − 1) | Busbw * n/2(n − 1) | Busbw |
| Latency | O(n) | O(log n) | O(1) |

In the above, Busbw refers to bus bandwidth, which refers to the hardware bandwidth, as compared with algbw, which refers to the algorithm bandwidth. The performance of allreduce may be deduced based on its algorithm bandwidth and bus bandwidth as follows:
  algbw:=input_size/time
  busbw:=transferred_size/time
  algbw=busbw/(transferred_size/input_size)

The ratio (transferred_size/input_size) denotes how much network traffic is incurred by all-reduce for every byte of input data. As discussed previously, for allreduce, the minimum ratio is 2(n−1)/n.

Figure 5:
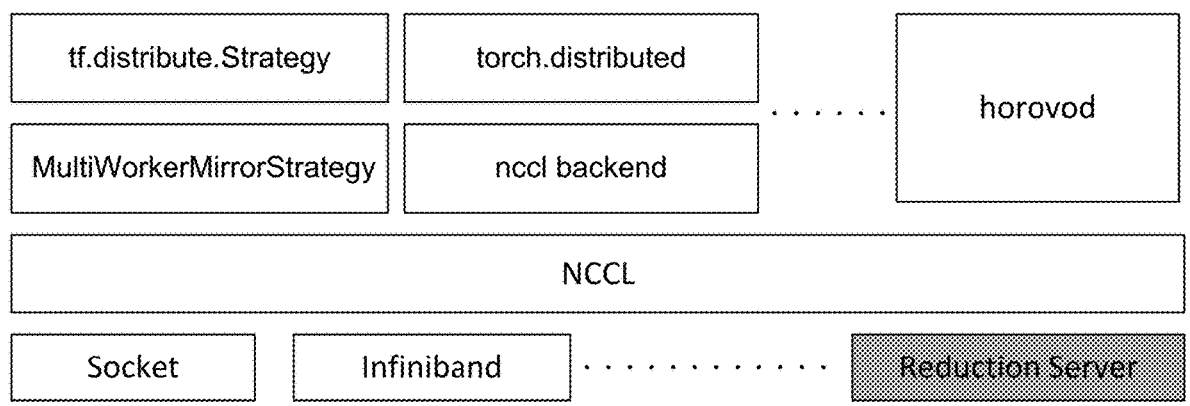
FIG. 5 is a block diagram of a data processing system model according to aspects of the disclosed technology.

FIG. 5 is a block diagram of a data processing system model 500 according to aspects of the disclosed technology. System model 500 involves implementing the worker roles as a transport in NCCL, while the reducer role is not a part of NCCL. In accordance with this aspect of the technology, when a worker executes a collective operation such as for example allreduce with Reduction Server mode enabled, the transport will then push then pull gradients from external workers. In this regard, the reducer role will comprise a different binary running separately outside the NCCL environment as depicted in FIG. 5. This implementation may be transparent to the user code except that users (or the platform) may likely be required to bring up reducers in addition to workers. This implementation is also compatible with frameworks such TensorFlow, PyTorch and MXnet.

Figure 6:
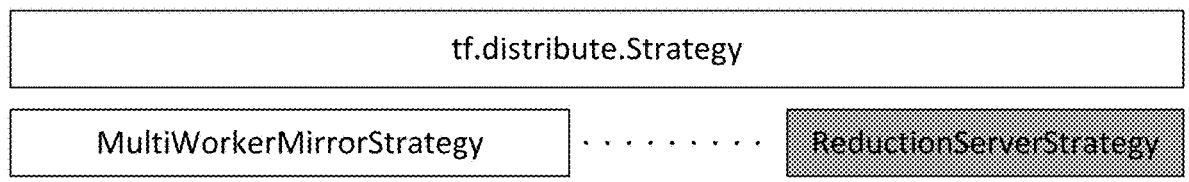
FIG. 6 is a block diagram of a data processing system model according to aspects of the disclosed technology.

FIG. 6 is a block diagram of a data processing system model 600 according to aspects of the disclosed technology. In this implementation, the worker role may be implemented as a tf.distribute. Strategy and the reducer role may be implemented as part of NCCL as ReductionServerStrategy. ReductionServerStrategy handles the connection and transfers between workers and reducers. This implementation allows Reduction Server control over communication topology, memory management, data copy, etc.

Figure 7:
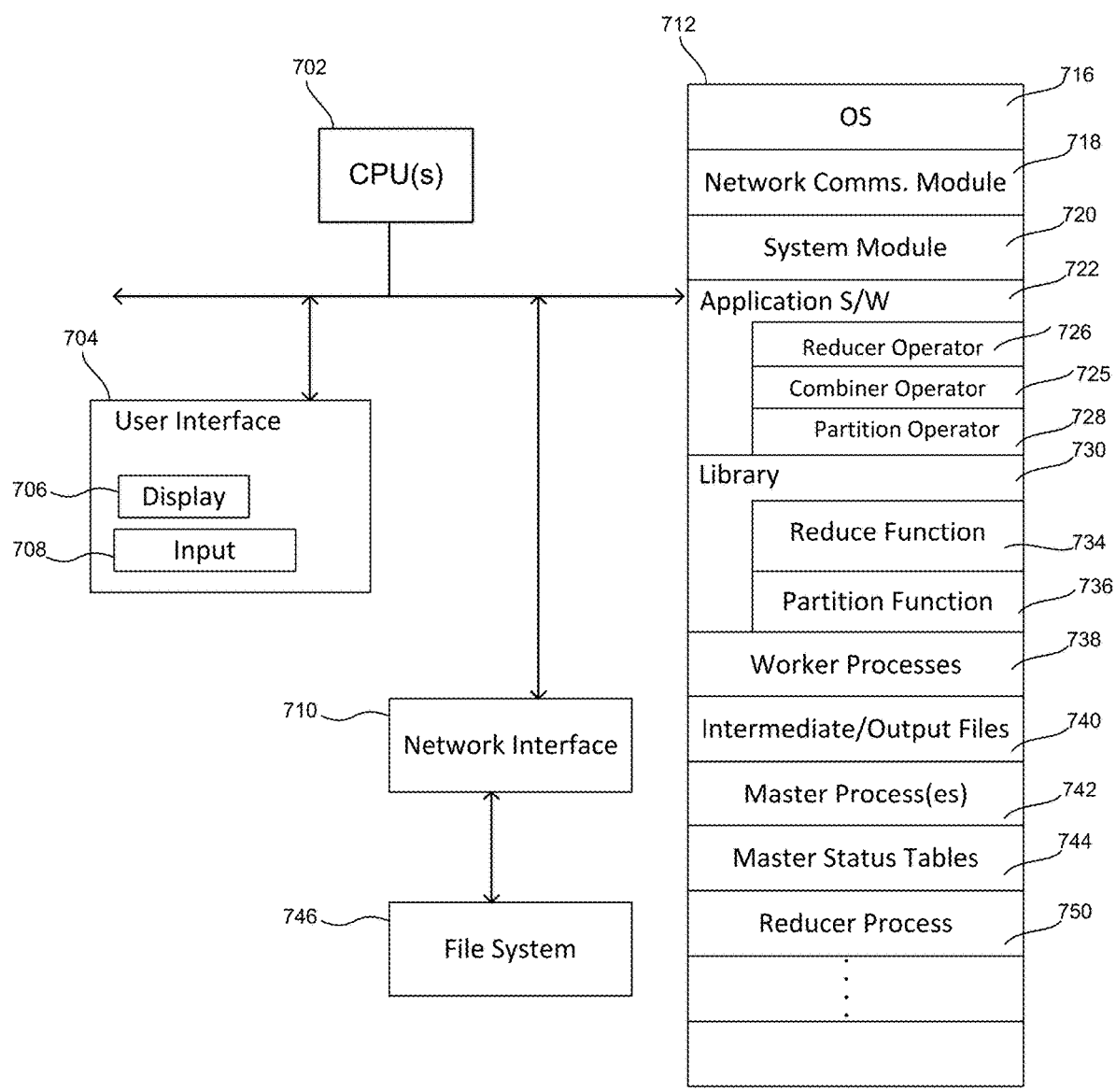
FIG. 7 is a block diagram of an example of a computer processing system according to aspects of the disclosed technology.

FIG. 7 is a computer system 700 that may be used in conjunction with the data processing systems 200 and 300 shown in FIGS. 1, 2 and 3. Computer system 700 may comprise computer system 158 of FIG. 1, as well as the systems discussed in relations to FIGS. 2 and 3 for managing work flow or jobs, and scheduling, instantiating and managing virtual machines as discussed above. The computer system 700 generally includes one or more processing units (CPUs, CPUs, TPUs) 702, one or more network or other communications interfaces 710, memory 712, and one or more communication buses 714 for interconnecting these components. The system 700 may optionally include a user interface 704, for instance a display 706 and a keyboard 708.

Memory 712 may include high speed random access memory and may also include non-volatile memory, such as one or more magnetic disk storage devices. Memory 712 may include mass storage that is remotely located from the central processing unit(s) 702.

The memory 712 stores an operating system 716 (e.g., Linux or Unix), a network communication module 718, a system initialization module 720, application software 722 and a library 730. The operating system 716 generally includes procedures for handling various basic system services and for performing hardware dependent tasks. The network communication module 718 is used for connecting the system 700 to a file system (FS) 746, servers or other computing devices via one or more communication networks, such as the Internet, other wide area networks, local area networks, metropolitan area networks, and the like. The system initialization module 720 initializes other modules and data structures stored in memory 714 required for the appropriate operation of the system 700. In some embodiments, the application software 722 includes a reduce operator 726 and a partition operator 728, and the library 730 includes application-independent reduce functions 734 and partition functions 736. The application software 722 may also include a combiner operator 725. The functions, procedures or instructions in the library 730 handle the application independent aspects of large scaled data processing jobs (e.g., synchronous training), while the application software 722 provides the application-specific functions for producing output data. The application software 722 may include source programs for the combiner, reduce and partition operators as well as the corresponding compiled programs, represented by binary file 310 in FIG. 3.

One or more status tables 744 are also included to track tasks and processes, as described with respect to FIG. 3. In some embodiments, the computer system 700 includes worker processes 738, intermediate files 740, one or more master process(es) 742 and reducer processes. The interaction of worker processes 438, reducer processes and master processes 442 were described above.

As previously discussed in relation to FIG. 3, an application programmer can create a script or program using the application software 722, which includes one or more operators 724, 726 and 728. The script or program is processed into binary file 310 and provided to the work queue master 314.

Example Methods

Figure 8:
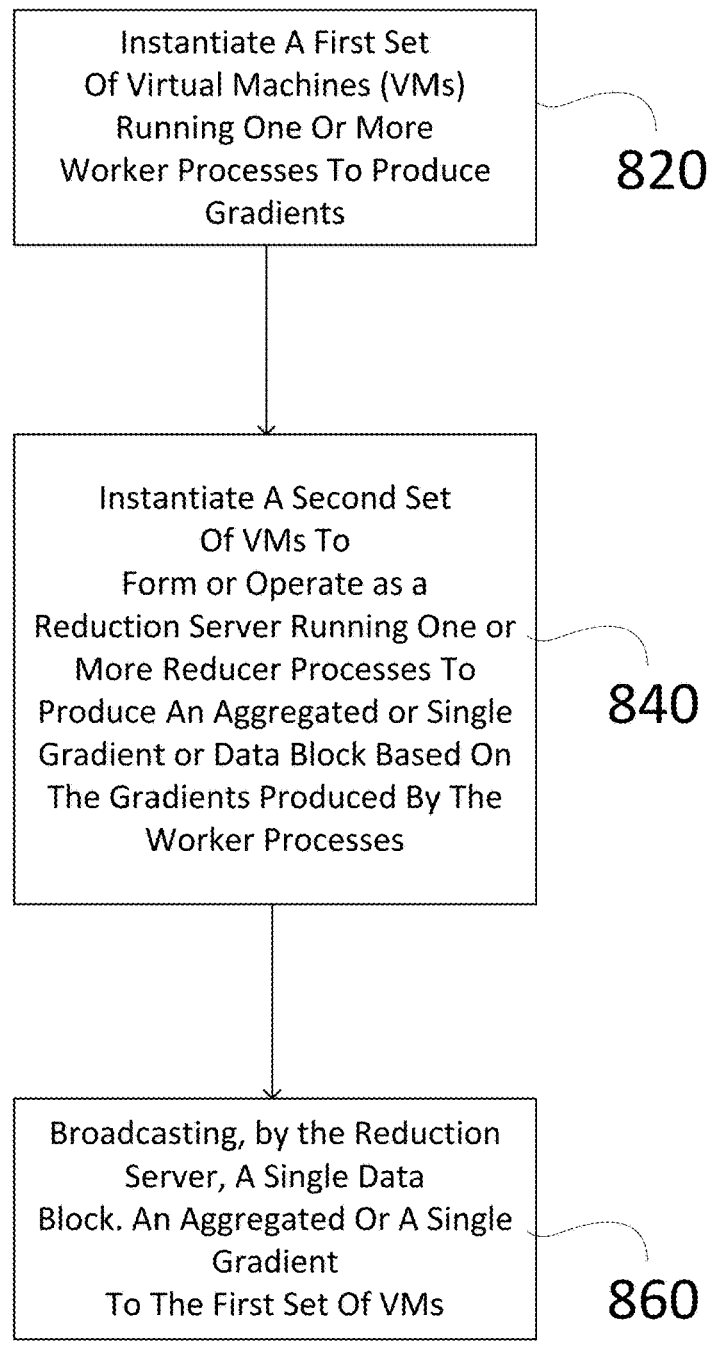
FIG. 8 is a block diagram of a method according to aspects of the disclosed technology.

FIG. 8 is a block diagram of a method 800 according to aspects of the disclosed technology. At block 820, the method instantiates a first set of virtual machines running one or more worker processes. Each worker process associated with a virtual machine operates on a data block it receives to produce respective gradients as discussed above in relation to FIG. 3.

At block 840, the method instantiates a second set of virtual machines that collectively form or operate as a reduction server. The reduction server operates on the gradients produced by the first set of virtual machines to produce an aggregated gradient or single data block. The reduction server for instance may comprise a number of reducers or reducer processes, each of which run on a respective one of the second set of virtual machines and produce a gradient as discussed above in relation to FIG. 3.

At block 860, the reduction server broadcasts the single data block or gradient to the first set of virtual machines. The first set of virtual machines may thereafter further process the single gradients or block of data to produce an output file.

Figure 9:
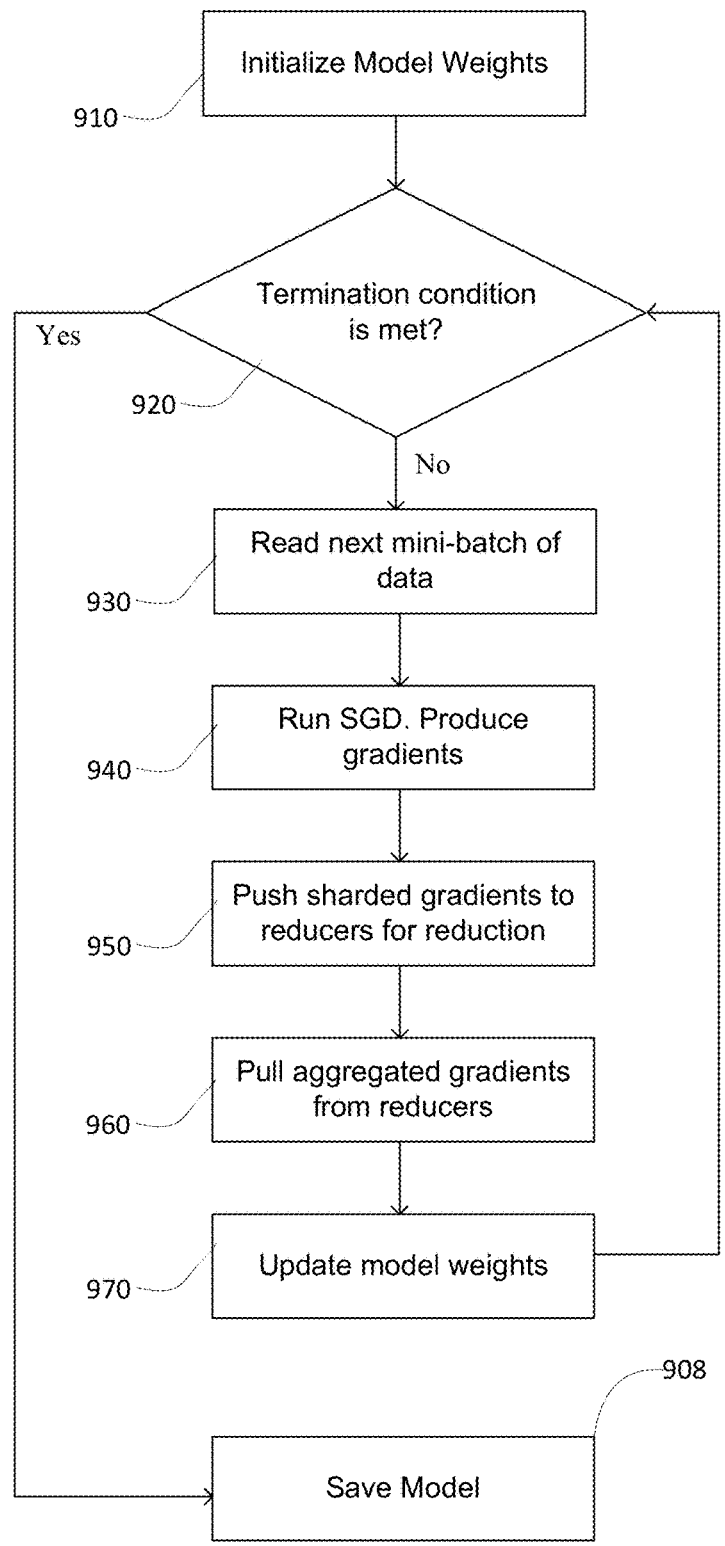
FIG. 9 is a block diagram of a method according to aspects of the disclosed technology.

FIG. 9 shows a method or processing flow 900 in accordance with aspects of the disclosed technology. Method 900 may comprise the processing sub-steps that take place in block 820 of FIG. 8. As shown in FIG. 9, the process begins at block 910 with an initial set of model weights or parameters associated with a machine learning model. At decision diamond 920 a determination is made as to whether the model weights meet a termination condition. The termination condition may comprise for example an amount of error between the model and related data, e.g., the parameters. If the termination condition is not met, processing proceeds to block 930.

At block 930, a worker reads a next mini-batch of data. At block 940, the worker perform SGD operations on the mini-batch that was read to produce one or more gradients. At block 940, a worker pushes sharded gradients of reducers for reduction or reduction processing. At block 960, a worker pulls aggregated gradients from reducers and at block 970 the worker uses the aggregated gradient to update the model weights or parameters. The push and pull process may take place as previously discussed.

The updated model weights or parameters are returned to decision 920 to determine to if the termination condition is met. If the termination condition is not met, the worker(s) perform another iteration of the process depicted as blocks 930-970. If the termination condition is met, processing proceeds to block 980, where the model is saved. The saved model may then be provided as an output file to a customer. The process depicted in FIG. 9 may be performed by a worker running on VM that uses vGPUs or vTPUs.

Figure 10:
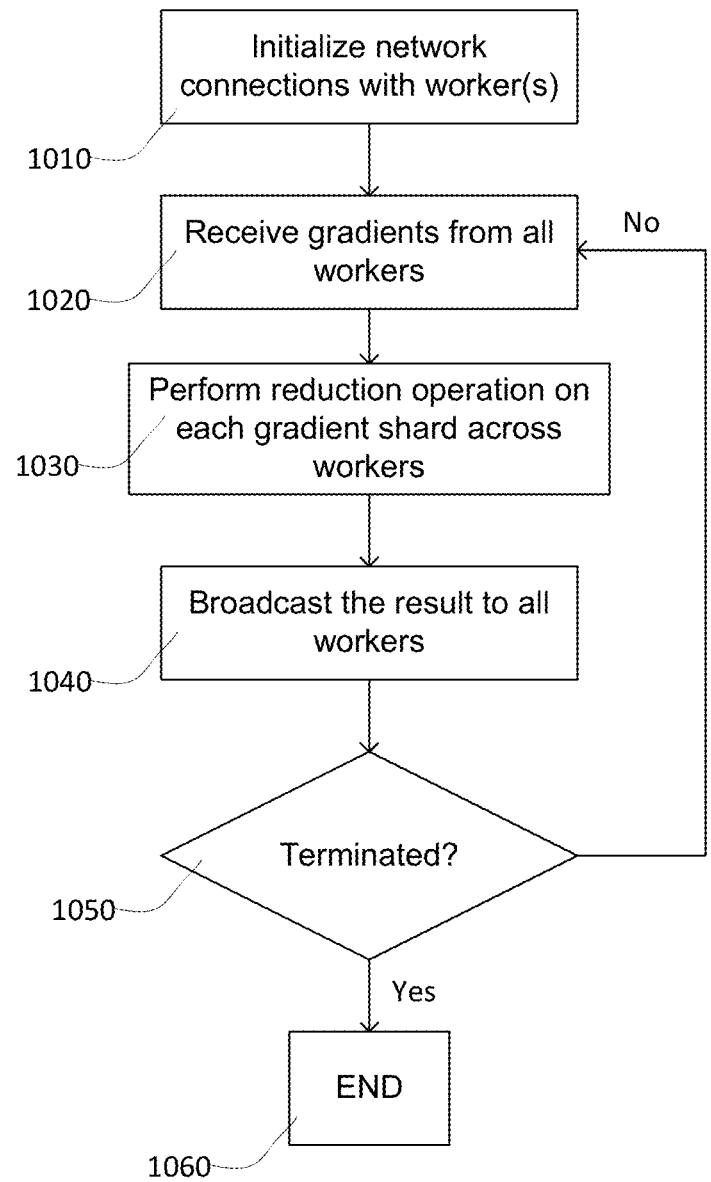
FIG. 10 is a block diagram of a method according to aspects of the disclosed technology.

FIG. 10 depicts a method or processing flow 1000 in accordance with aspects of the disclosed technology. As mentioned above and shown in FIG. 9, workers push and pull gradients from reducers. FIG. 10 depicts the processing perform by a reducer. At block 1010, processing begins with initialization, by a reducer, of network connections with worker(s). A reducer, at block 1020, receives gradients from all workers involved in the job. At block 1030, a reducer performs reduction operations on each gradient shard it receivers from each worker. At block 1040, a reducer broadcasts its results to all workers. At decision diamond 1050, a reducer determines whether processing is terminated. If processing is not terminated, the reducer returns to block 1020 for another iteration of processing. Otherwise, processing ends at block 1060. The process depicted in FIG. 10 may be performed on a VM that uses vCPUs.

Figure 11:
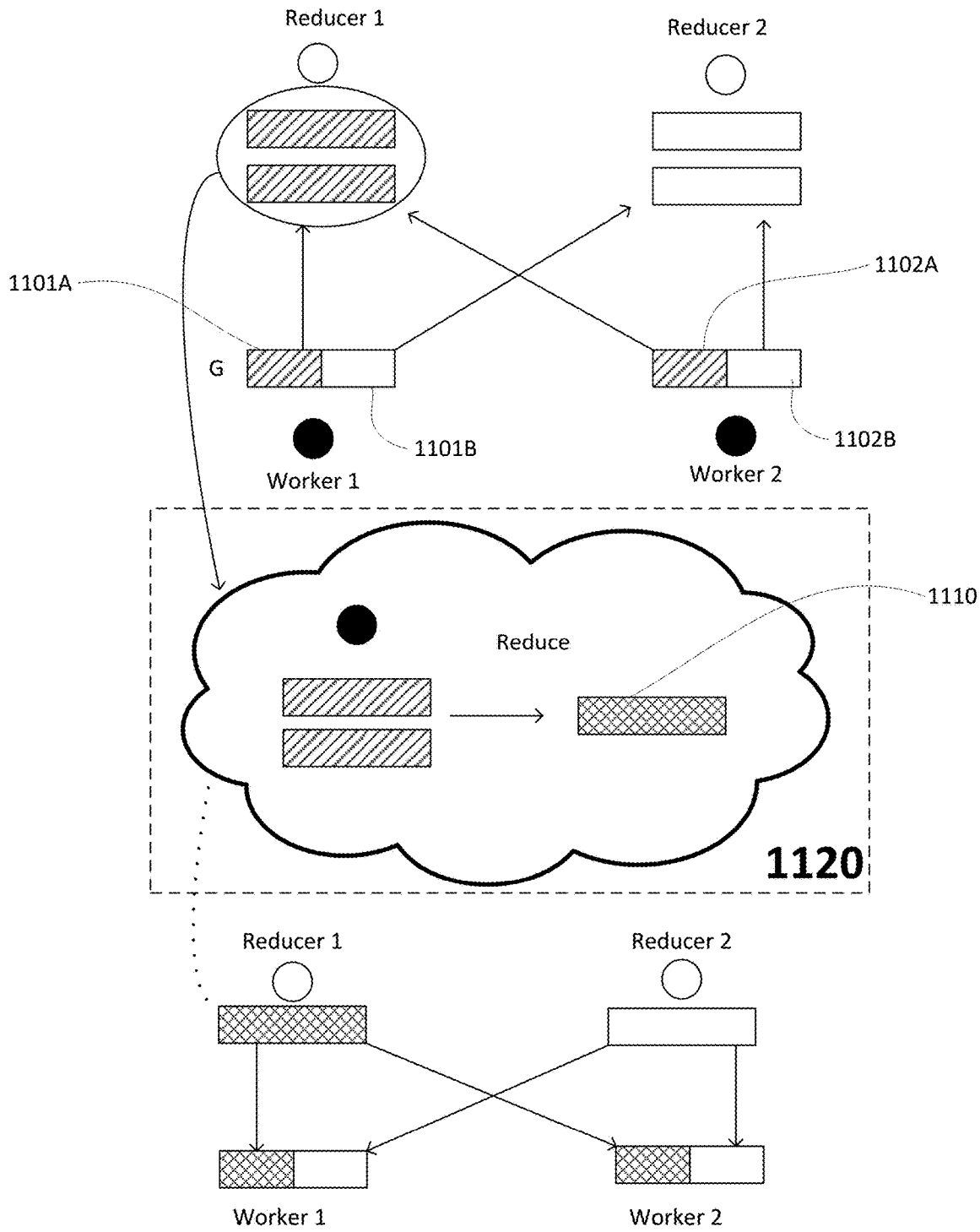
FIG. 11 is an example data processing flow according to aspects of the disclosed technology.

FIG. 11 is a block diagram of an example process flow 1100 according to aspects of the disclosed technology. FIG. 11 shows an example in which two workers are associated with two reducers for a processing iteration. As shown, a first gradient of each worker (shown as sub-blocks 1101A and 1102A) are pushed to reducer 1. Similarly, gradient sub-blocks 1101B and 1102B are pushed to reducer 2. Reducer 1 then aggregates the gradients it receives into gradient 1110 as is depicted via reduction processing block 1120 for reducer 1, which receives gradients 1101A and 1102A. Reducer 2 would perform similar processing on gradients 1101B and 1102B. As shown, Reducers 1 and 2 thereafter broadcast their respective gradients to Workers 1 and 2, as is depicted in the portion of FIG. 11 beneath block 1120.

Example Use Cases

As discussed above, Reduction Server may re-use the same all-reduce API so it may be used as a drop-in replacement for existing all-reduce primitives. During each "all-reduce" operation, workers push and pull gradients from reducers. Therefore, Reduction Server will be compatible with most frameworks that use collective operations.

Push and Pull operations are not duplex, but Reduction Server is able to fully utilize the bidirectional network bandwidth by doing tensor partitioning and pipelining Before performing the push and pull operation, gradient tensors may be partitioned into small chunks. After pushing the first chunk to the reducer, a worker pulls the first chunk in real time, e.g., as part the same iteration or during the same process cycle. At the same time, the worker starts pushing the second chunk. Therefore, the bidirectional bandwidth is fully utilized except for the first chunk and last chunk.

As an example, assuming Reduction Server is running external to NCCL AI platform support, such as CAIP training, may be implemented as an option allowing users to enable Reduction Server when submitting a job. For the reducer-support side, if Reduction Server is enabled, CAIP Training will add additional CPU VMs to the job as reducers. These reducer VMs will run an internal container image that contains the reducer binary.

Figure 12:
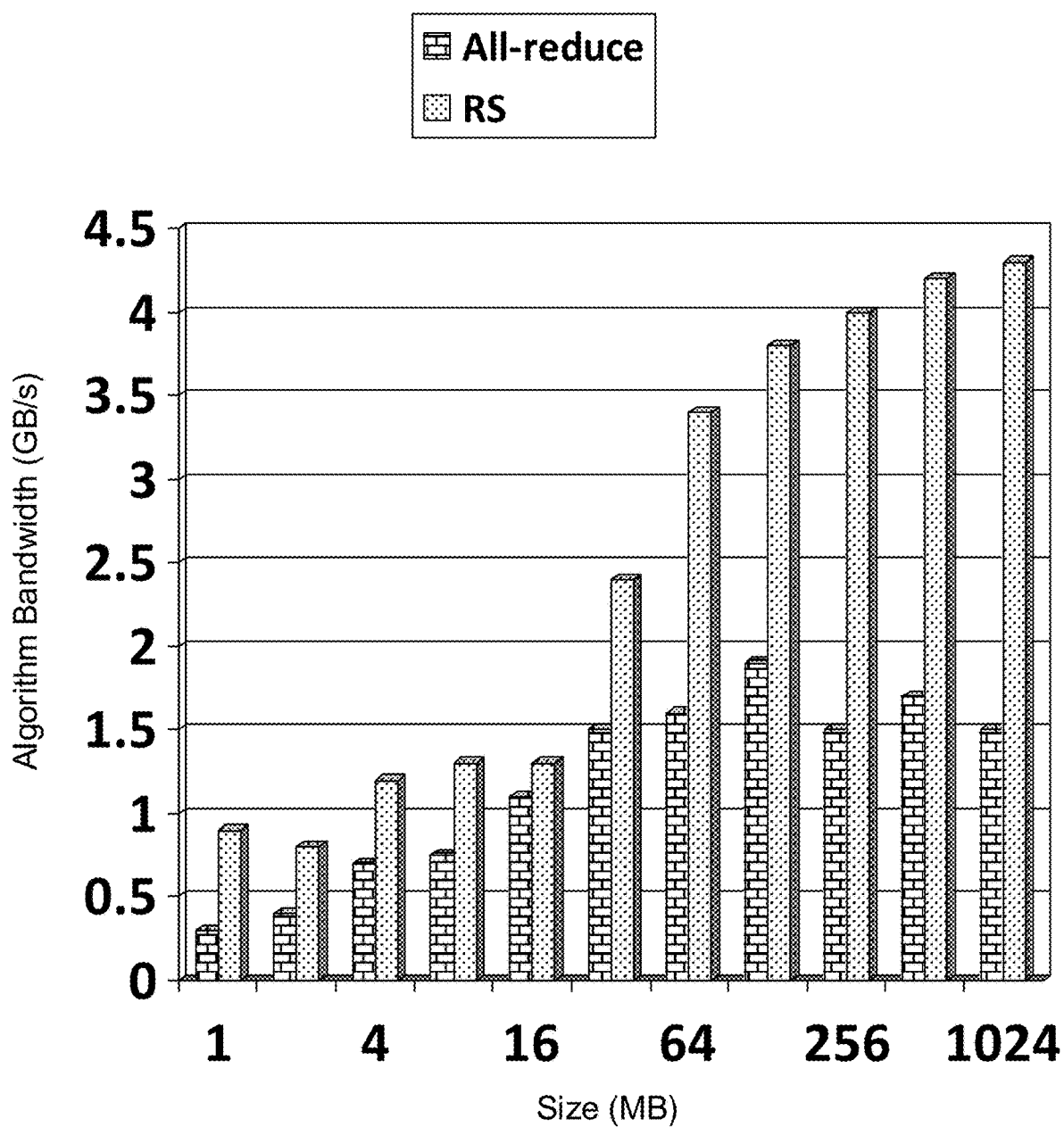
FIG. 12 shows a comparison of allreduce and Reduction Server in accordance with aspects of the disclosed technology.

As shown in FIG. 12, Reduction Server achieves ~2× algorithm bandwidth for large message sizes. Algorithm bandwidth thereby refers to the volume of data for which reductions are computed divided by the time it takes to compute the reductions.

In the context of data-parallel training of a neural network, where in each iteration, each worker takes a minibatch of input data, computes gradients of each weight (or parameter) with respect to the minibatch, averages across workers for each gradient, and then use the averaged gradients to update the model weights. allreduce is used to address the "averages across workers for each gradient" step, and Reduction Server is a drop-in replacement for allreduce.

Non-limiting aspects of the disclosed technology can include the following features:

¶1. A data processing system, comprising:
  one or more host processing devices, the one or more host processing devices supporting instantiation of a plurality of virtual machines;
  a first set of virtual machines comprising one or more of the plurality of virtual machines, the first set of virtual machines running one or more worker processes, each worker process operating on a respective data set to produce a respective gradient;
  a second set of virtual machines comprising one or more of the plurality of virtual machines, the second set of virtual machines running one or more reducer processes that operate on at least a portion of each respective gradient produced by each worker process to produce an aggregated gradient;
  wherein the one or more reducer processes cause the aggregated gradient to be broadcasted to each worker process.

¶2. The system according to ¶1, wherein each of the respective data set comprises data blocks of equal size.

¶3. The system according to any one of ¶1 through ¶2, wherein the data blocks of equal size comprise data blocks generated by splitting an input data stream.

¶4. The system according to any one of ¶1 through ¶2, wherein the data blocks of equal size are of a size proportional to the number of reducer processes running on the one or more virtual machines.

¶5. The system according to any one of ¶1 through ¶4, wherein the one more host processing devices comprise at least one graphics processing unit (GPU) for hosting the first set of virtual machines.

¶6. The system according to any one of ¶1 through ¶5, wherein the one more host processing devices comprise at least one central processing unit (CPU) for hosting the second set of virtual machines.

¶7. The system according to any one of ¶1 through ¶6, wherein a first total bandwidth associated with use of the first set of virtual machines is equal to a second total bandwidth associated with use of the second set of virtual machines.

¶8. The system according to any one of ¶1 through ¶7, wherein the one or more reducer processes accept gradients within a time deadline defined by receipt of a first one of the gradients by a first reducer process among the one or more reducer processes.

¶9. The system according to any one of ¶1 through ¶8, wherein the one or more worker processes are instantiated as a communication primitive of an Application Programming Interface (API) library or separate from an API library.

¶10. The system according to ¶9, wherein when the one or more worker processes are instantiated as a communication primitive of an API library, instantiated worker processes push and pull gradients from the one or more reducer processes.

¶11. The system according to ¶9, wherein when the one or more worker processes are instantiated as separate from an API library, connections between a reducer process function manages connections and data transfers between the one or more worker processer and the one or more reducer processes.

¶12. The system according to any one of ¶1 through ¶11, wherein each worker process of the one or more worker processes partition gradients produced by each worker process into respective gradient chunks and a given worker process pulls a first gradient chunk from a first reduction process while it pushes a second gradient chunk to the first reduction process.

¶13. The system according to any one of ¶1 through ¶12, wherein the worker processes adjust weight coefficient of a neural network according to a mini batch stochastic gradient descent in the context of training a neural network.

¶14. The system according to any one of ¶1 through ¶13, wherein a reduction is computed by the one or more reducer processes only over a subset of gradient batches received from a subset of the one or more worker processes ignoring a remainder of gradient batches, the subset having a predetermined size m or the size of the subset being determined by gradient batches received up to a predetermined deadline T after receipt of a first gradient batch.

¶15. A data processing system, comprising:
  one or more host processing devices, the one or more host processing devices supporting instantiation of a plurality of virtual machines;
  a first set of virtual machines comprising one or more of the plurality of virtual machines, the first set of virtual machines running one or more worker processes, each worker process operating on a respective data block to each produce a respective gradient;
  a reduction server comprising one or more reducers, each reducer comprising a virtual machine running a reducer process that operates on at least a portion of each respective gradient to generate an aggregated gradient;

wherein the reduction server broadcasts the aggregated gradient to the one or more virtual machines running the one or more worker processes.

¶16. The data processing system of ¶15, wherein a reduction is computed by the reduction server only over a subset of gradient batches received from a subset of workers ignoring a remainder of gradient batches, the subset having a predetermined size m or the size of the subset being determined by gradient batches received up to a predetermined deadline T after receipt of a first gradient batch.

¶17. The system according to any one of ¶15 through ¶16, wherein each of the respective data block comprises data blocks of equal size.

¶18. The system according to any one of ¶15 through ¶17, wherein the data blocks of equal size are of a size proportional to the number of reducer processes running on the one or more virtual machines.

¶19. The system according to any one of ¶15 through ¶18, wherein the one more host processing devices comprise at least one graphics processing unit (GPU) for hosting the first set of virtual machines.

¶20. The system according to any one of ¶11 through ¶19, wherein the one more host processing devices comprise at least one central processing unit (CPU) for hosting the reducers of the reduction server.

¶21. The system according to. any one of ¶15 through ¶20, wherein a first total bandwidth associated with use of the first set of virtual machines is equal to a second total bandwidth associated with use of the reduction server.

¶22. The system according to any one of ¶15 through ¶21, wherein each reducer accept gradients within a time deadline defined by receipt of a first one of the gradients by a first reducer among the one or more reducers.

¶23. The system according to any one of ¶1 through ¶22, wherein the one or more worker processes are instantiated as a communication primitive of an Application Programming Interface (API) library or separate from an API library.

¶24. The system according to ¶23, wherein when the one or more worker processes are instantiated as a communication primitive of an API library, instantiated worker processes push and pull gradients from the one or more reducer processes.

¶25 The system according to ¶23, wherein when the one or more worker processes are instantiated as separate from an API library, connections between a reducer process function manages connections and data transfers between the one or more worker processer and the one or more reducer processes.

¶26. The system according to any one of ¶15 through ¶25, wherein the one or more worker processes partition gradients produced by each worker process into respective gradient chunks and a given worker process pulls a first gradient chunk from a first reducer while it pushes a second gradient chunk to the reducer.

¶27. The system according to any one of ¶15 through ¶26, wherein the worker processes adjust weight coefficient of a neural network according to a mini batch stochastic gradient descent in the context of training a neural network.

¶28. A data processing method for synchronous distributed training, comprising:
instantiating a first set of virtual machines running one or more worker processes, each worker process operating on a respective data block to each produce a respective gradient;
instantiating a second set of virtual machines that comprise a reduction server, the second set of a virtual machines running a reducer process that operates on at least a portion of each respective gradient to generate an aggregated gradient; and
broadcasting, by the reduction server, the aggregated gradient to the first set of virtual machines.

¶29. The data processing according method to ¶28, comprising processing, by the first set of virtual machines, the aggregated gradient to produce an output data file.

¶30. The data processing method according to any one of ¶28 through ¶29, comprising computing a reduction only over a subset of gradient batches received from a subset of workers ignoring a remainder of gradient batches, the subset having a predetermined size m or the size of the subset being determined by gradient batches received up to a predetermined deadline T after receipt of a first gradient batch.

¶31. The data processing method according to any one of ¶28 through ¶30, wherein instantiating the first set of virtual machines running one or more worker processes comprises instantiating the first set of virtual machines on at least one graphics processing unit (GPU).

¶32. The data processing method according to any one of ¶28 through ¶31, wherein instantiating the second set of virtual machines that comprise the reduction server comprises instantiating one or more central processing unit (CPU) for hosting one or more reducers of the reduction server.

¶33. The data processing method according to ¶32, comprising accepting by each of the one or more reducers gradients within a time deadline defined by receipt of a first one of the gradients by a first reducer among the one or more reducers.

¶34. The data processing method according to any one of ¶28 through ¶33, wherein a first total bandwidth associated with use of the first set of virtual machines is equal to a second total bandwidth associated with use of the reduction server.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A data processing system, comprising:
one or more host processing devices, the one or more host processing devices supporting instantiation of a plurality of virtual machines;
a first set of virtual machines comprising one or more of the plurality of virtual machines, the first set of virtual machines running one or more worker processes, each worker process operating on a respective data set to produce a respective gradient; and
a second set of virtual machines comprising one or more of the plurality of virtual machines, the second set of virtual machines running one or more reducer pro- cesses that operate on at least a portion of each respective gradient produced by each worker process to produce an aggregated gradient, the second set of virtual machines being configured such that computations or communications associated with the one or more reducer processes are balanced across the one or more reducer processes;

wherein the second set of virtual machines are stateless and the one or more reducer processes cause the aggregated gradient to be broadcasted to each worker process wherein a first total bandwidth associated with use of the first set of virtual machines is equal to a second total bandwidth associated with use of the second set of virtual machines.

2. The system according to claim 1, wherein each of the respective data set comprises data blocks of equal size.

3. The system according to claim 2, wherein the data blocks of equal size comprise data blocks generated by splitting an input data stream.

4. The system according to claim 2, wherein the data blocks of equal size are of a size proportional to the number of reducer processes running on the one or more virtual machines.

5. The system according to claim 1, wherein the one more host processing devices comprise at least one graphics processing unit (GPU) for hosting the first set of virtual machines.

6. The system according to claim 1, wherein the one more host processing devices comprise at least one central processing unit (CPU) for hosting the second set of virtual machines.

7. The system according to claim 1, wherein the one or more reducer processes accept gradients within a time deadline defined by receipt of a first one of the gradients by a first reducer process among the one or more reducer processes.

8. The system according to claim 1, wherein the one or more worker processes are instantiated as a communication primitive of an Application Programming Interface (API) library or separate from an API library.

9. The system according to claim 8, wherein when the one or more worker processes are instantiated as a communication primitive of an API library, instantiated worker processes push and pull gradients from the one or more reducer processes.

10. The system according to claim 8, wherein when the one or more worker processes are instantiated as separate from an API library, connections between a reducer process function manages connections and data transfers between the one or more worker processes and the one or more reducer processes.

11. The system according to claim 1, wherein each worker process of the one or more worker processes partition gradients produced by each worker process into respective gradient chunks and a given worker process pulls a first gradient chunk from a first reduction process while it pushes a second gradient chunk to the first reduction process.

12. The system according to claim 1, wherein the one or more worker processes adjust weight coefficient of a neural network according to a mini batch stochastic gradient descent in the context of training a neural network.

13. The system according to claim 1, wherein a reduction is computed by the one or more reducer processes only over a subset of gradient batches received from a subset of the one or more worker processes ignoring a remainder of gradient batches, the subset of gradient batches having a predetermined size m or the size of the subset of gradient batches being determined by gradient batches received up to a predetermined deadline T after receipt of a first gradient batch.

14. The system according to claim 1, wherein the communications or computations are balanced by distributing the communications or computations evenly across the one or more reducer processes.

15. A data processing method for synchronous distributed training, comprising:
instantiating a first set of virtual machines running one or more worker processes, each worker process operating on a respective data block to each produce a respective gradient;
instantiating a second set of virtual machines that comprise a reduction server, the second set of virtual machines being stateless and running one or more reducer processes that operates on at least a portion of each respective gradient to generate an aggregated gradient;
configuring the second set of virtual machines such that computations or communications are balanced across the one or more reducer processes; and
broadcasting, by the reduction server, the aggregated gradient to the first set of virtual machines, and
wherein a first total bandwidth associated with use of the first set of virtual machines is equal to a second total bandwidth associated with use of the reduction server.

16. The data processing method according to claim 15, comprising computing a reduction only over a subset of gradient batches received from a subset of workers ignoring a remainder of gradient batches, the subset of gradient batches having a predetermined size m or the size of the subset of gradient batches being determined by gradient batches received up to a predetermined deadline T after receipt of a first gradient batch.

17. The data processing method according to claim 15, wherein instantiating the first set of virtual machines running one or more worker processes comprises instantiating the first set of virtual machines on at least one graphics processing unit (GPU).

18. The data processing method according to claim 15, wherein instantiating the second set of virtual machines that comprise the reduction server comprises instantiating one or more central processing units (CPUs) for hosting one or more reducers of the reduction server.

19. The data processing method according to claim 18, comprising accepting by each of the one or more reducers gradients within a time deadline defined by receipt of a first one of the gradients by a first reducer among the one or more reducers.

* * * * *